United States Patent [19]

Sayo et al.

[11] Patent Number: 4,653,288
[45] Date of Patent: Mar. 31, 1987

[54] APPARATUS FOR MEASURING REFRIGERANT FLOW RATE IN REFRIGERATION CYCLE

[75] Inventors: Kosaku Sayo, Katsuta; Seijiro Tani, Ibaraki; Seigo Miyamoto; Kenji Emi, both of Katsuta; Toshihiko Fukushima, Ibaraki, all of Japan

[73] Assignee: Hitachi, Ltd., Tokyo, Japan

[21] Appl. No.: 751,135

[22] Filed: Jul. 2, 1985

[30] Foreign Application Priority Data

Jul. 2, 1984 [JP] Japan .................................. 59-135304
Sep. 7, 1984 [JP] Japan .................................. 59-186373

[51] Int. Cl.$^4$ .......................... F25B 41/00; G01F 1/36
[52] U.S. Cl. ........................................ 62/210; 62/225; 73/861.52
[58] Field of Search ........... 73/861.52, 861.53, 861.58, 73/861.61, 861.62, 198; 62/210, 212, 225

[56] References Cited

U.S. PATENT DOCUMENTS

| 1,924,125 | 8/1933 | Linderman, Jr. | 73/861.62 |
| 1,946,319 | 2/1934 | Hodgson et al. | 73/861.62 |
| 4,131,015 | 12/1978 | Chaula et al. | 73/861.53 X |
| 4,375,169 | 3/1983 | Torresin | 73/861.53 |
| 4,499,739 | 2/1985 | Matsuoka et al. | 62/225 X |

FOREIGN PATENT DOCUMENTS 0073726 4/1984 Japan .................................. 73/861.52

Primary Examiner—Herbert Goldstein
Attorney, Agent, or Firm—Antonelli, Terry & Wands

[57] ABSTRACT

A refrigerant flow rate measuring apparatus has a means for detecting the opening degree A of an expansion valve of a refrigeration cycle, a pressure detecting means for detecting the refrigerant pressure Pi at upstream side of the expansion valve, a pressure detecting means for detecting the refrigerant pressure Po at downstream side of the expansion valve, a refrigerant density detecting means for detecting the density $\gamma i$ of the refrigerant at the inlet side of the expansion valve, a converting means for directly or indirectly converting the values detected by the detecting means into electric signals, and a calculating means for calculating the flow rate of the refrigerant in accordance with the following formula, from the electric signals.

$$Q = CA \sqrt{(Pi - Po)\gamma i}$$

14 Claims, 7 Drawing Figures

APPARATUS FOR MEASURING REFRIGERANT FLOW RATE IN REFRIGERATION CYCLE

BACKGROUND OF THE INVENTION

The present invention relates to an apparatus for measuring the flow rate of refrigerant in a refrigeration cycle.

In, for example, article 3.2.2 of "Method of Refrigerant Flow Rate" in annex 1 of JIS B 8615-1979, an apparatus for measuring the flow rate of refrigerant in a refrigeration cycle is proposed wherein the flow rate of pressurized liquid refrigerant is directly measured by of a turbine-type flow meter disposed between a condenser and an expansion valve.

In general, the refrigerant flow rate measuring apparatus such as the turbine-type flow meter designed to directly measure the flow rate encounters problems in that the size of the apparatus is impractically large and that presence of many movable parts impairs the reliability of the apparatus during the long use, particularly when the apparatus is subjected to vibration. Therefore, this type of apparatus could be used only in the cases where there is no substantial restriction in the space and where the frequency and condition of use are not critical, as in the case of, for example, an experimental plant.

Accordingly, an object of the invention is to provide a small-sized refrigerant flow rate measuring apparatus which is capable of sustaining a long use even under severe operating conditions.

The invention is based upon such an idea that the flow rate of a fluid in a pipeline can be calculated from the opening degree of a valve disposed in the pipline and the pressure differential across the valve. This basic idea is reported on p 92 of Transactions of the Japan Society of Mechanical Engineers, part 2, vol. 34, No. 257 (S43-1).

More specifically, in order to achieve the object set forth above, the present invention provides a refrigerant flow rate measuring apparatus comprising: a high-pressure side pressure detecting means for detecting the refrigerant pressure at the upstream side of an expansion valve; a low-pressure side pressure detecting means for detecting the refrigerant pressure at the downstream side of the expansion valve; an expansion valve opening degree detecting means for detecting the degree of opening of the expansion valve; and a computing means for determining the pressure difference between the high- and low-pressure side pressure detecting means and for computing the flow rate of refrigerant in the expansion valve from the square root of the pressure difference and the output of the expansion valve opening detecting means.

DETAILED DESCRIPTION

The invention will be more fully understood from the following description of an embodiment which is applied to an automotive air conditioner of the type disclosed in Japanese Patent Publication No. -16353/1981, when the description is read in conjunction with the accompanying drawings.

Figure 1:
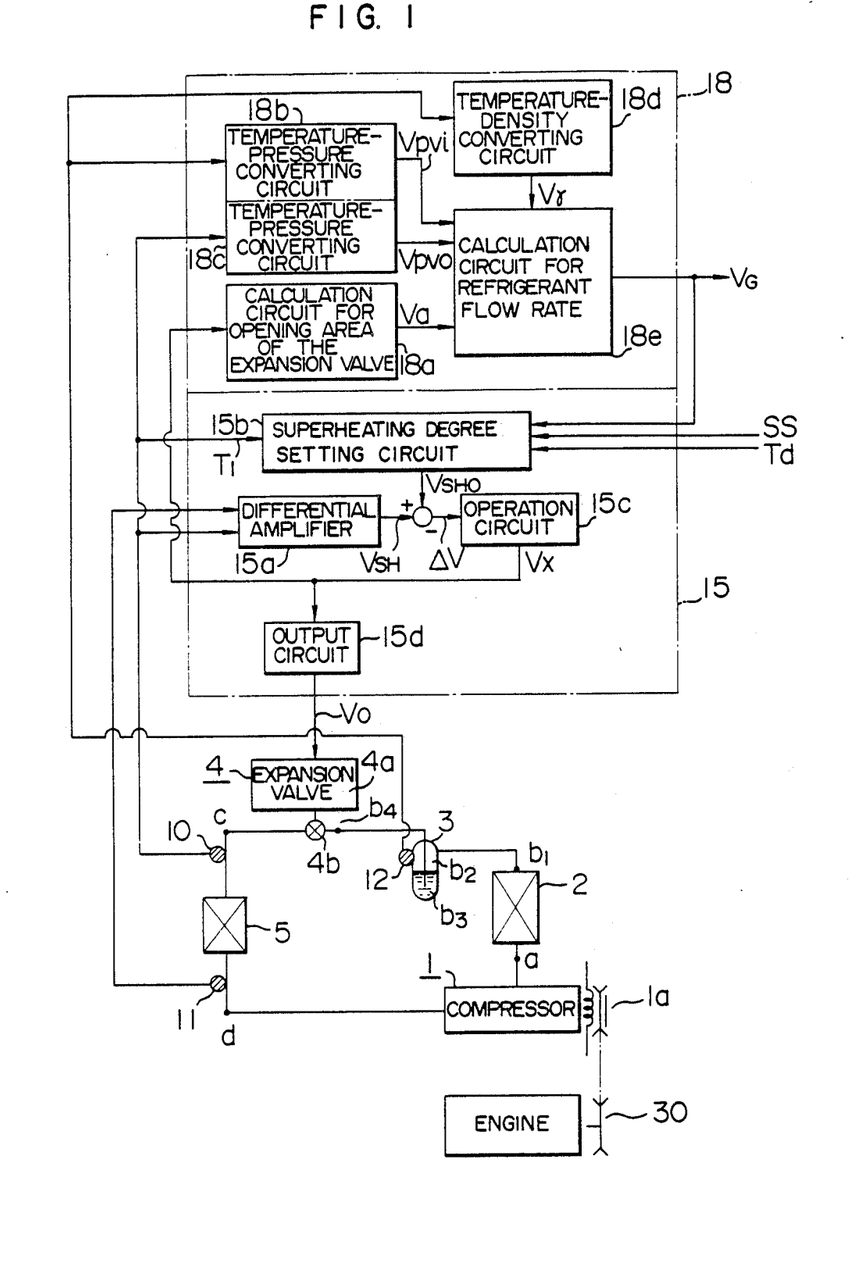
FIG. 1 is an illustration showing the system construction of an embodiment of the invention.

Referring now to the drawings, wherein like reference numerals are used throughout the various views to designate like parts and, more particularly, to FIG. 1, according to this figure, an air conditioner has a compressor 1 selectively driven by an engine 30 through an electromagnetic clutch 1a, with refrigerant being compressed by the compressor 1 to high temperature and pressure in a mixed phase, i.e., partly in the gaseous phase and partly in the liquid phase. The gaseous and liquid phases of the refrigerant is separated from each other in a liquid tank 3 and only the liquid phase of the refrigerant removed from the liquid tank 3. The liquid refrigerant flows through a restriction in an expansion valve 4 so that it makes an adiabatic expansion and become a mist refrigerant of low pressure which easily evaporates. This mist refrigerant then flows through an evaporator 5 where it is evaporated into gaseous phase through absorption of heat around the evaporator. The thus formed gaseous refrigerant flows back to the compressor 1.

A thermistor 10, secured to the refrigerant pipeline on the inlet of the evaporator 5, detects the refrigerant temperature at the evaporator inlet, while another thermistor 11, secured to the refrigerant pipeline on the outlet of the evaporator 5, detects the refrigerant temperature at the outlet of the evaporator.

The refrigerant flowing in the evaporator 5 is superheated as a result of heat exchange with the air flowing around the evaporator. A greater heat load of the air causes a higher degree of superheating. Conversely, when the heat load of the air is small, the degree of superheating is correspondingly small.

It is, therefore, possible to attain a high efficiency of a refrigeration cycle in accordance with the heat load, provided that the flow rate of the refrigerant is controlled in such a manner so as to maintain the superheating degree of the refrigerant at the evaporator outlet at the optimum level which is determined by the factors such as the nature of the refrigerant and the capacity of the heat exchanger.

According to the invention, the flow rate of the refrigerant is controlled through the control of the ON-OFF duty (the ratio between the opening period and the closing period) of an electromagnetic expansion valve in accordance with the degree of superheating which is computed from the refrigerant temperatures $T_1$ and $T_2$ at the inlet and outlet sides of the evaporator, as in the case of Japanese Patent Publication No. 16353/1981.

The correlation between the refrigerant temperatures $T_1$ and $T_2$ at the evaporator outlet and inlet of the evaporator outlet and the superheating degree SH can be approximated by the following formula:

$$SH = (T_2 - T_1) + \Delta T \tag{1}$$

where, ΔT represents the value for the compensation for the pressure drop in the evaporator. It has been confirmed through experiments that the compensation value ΔT is given by the following formula:

$$\Delta T = 3.25 - 3/40 T_i \quad (2)$$

The output signals from the thermistors 10 and 11 are inputted to a differential amplifier 15a of the control circuit 15. The differential amplifier 15a produces a voltage signal $V_{SH}$ which corresponds to the difference between the outputs of both thermistors. A superheating degree setting circuit 15b is adapted to set the degree of superheating within the range of 5° to 10° in accordance with the operating conditions of the refrigeration cycle, and to produce a voltage output signal $V_{SHO}$ corresponding to the thus set superheating degree.

The term "operating conditions" is used here to generally mean conditions or states of refrigeration cycle operation such as acceleration/deceleration of the compressor, pressure drop in the evaporator, whether the cycle is being started or not, and the temperature Td of the gas discharged from the compressor.

In automotive air conditioners, the operation speed of the compressor is determined regardless of the heat load, because the compressor is driven by the engine which operates at varying speed. If the operation speed of the compressor is changed gently, the flow rate of the refrigerant and, hence, the superheating degree are changed gently and the opening control of the expansion valve by the PI (Proportional Integral) follows up the change in the superheating degree. On the other hand, an abrupt change in the speed of the compressor due to a rapid acceleration and deceleration of the engine causes a drastic change in the refrigerant flow rate and a consequent abrupt change in the superheating degree. However, since the control of the expansion valve opening uses the PI, an integrating term influences and the change of the opening degree of the expansion valve cannot follow up this drastic change in the superheating degree. Therefore, an excessive and an insufficient cooling result at the time of rapid acceleration and deceleration of the engine.

In the transient period of the engine operation, therefore, it is necessary that the opening control signal for controlling the opening of the expansion valve on the basis of the superheating degree be corrected in accordance with the rate of acceleration and deceleration.

In general, refrigerant in the liquid state and the gaseous refrigerant after evaporation coexists in the evaporator. The superheating degree various depending on the position of the boundary between the liquid and gaseous phases of the refrigerant, even when the temperatures difference between the inlet and outlet sides of the evaporator is the same. It is, therefore, necessary that the superheating degree calculated on the basis of the temperature difference be compensated suitably in accordance with a factor which is referred to as "pressure loss" and detailed in Japanese Patent Publication No. 16353/1981. The value for the pressure loss compensation can be approximated by a primary function of the refrigerant temperature $T_1$ at the evaporator inlet as shown, for example, by formula (2).

The physical state of the refrigerant is the same both at the inlet and outlet sides of the evaporator immediately after the start up of the refrigeration cycle, no difference in the evaporator temperature is observed between the inlet and outlet sides of the evaporator. In this state, the differential amplifier 15a which computes the superheating degree from the outputs of both thermistors 10 and 11 produces an output which corresponds to the zero superheating degree. When the superheating degree takes a small value such as zero, the expansion valve is controlled for smaller opening degree. That is, the expansion valve which has been closed before the starting of the refrigeration cycle is kept closed even after the starting of the refrigeration cycle. It is, therefore, necessary to forcibly open the expansion valve by, for example, giving an open pulse signal of a predetermined on-off ratio when the refrigeration cycle is started, as disclosed in Japanese Patent Publication No. 16353/1981.

Thus, the superheating degree setting circuit 15b produces a superheating degree setting signal which contains the components such as the correction signal CN corresponding to the acceleration and deceleration of the compressor, pressure compensation signal and the forcible opening signal SS on starting.

When the temperature of the gas discharged from the compressor has been raised to an extraordinarily high level, it is necessary to fully open the expansion valve regardless of the valve open signal so as to lower the discharged gas temperature thereby preventing seizure of the compressor, as well as breakdown of the components of the refrigeration cycle. In the event of such an extraordinarily high temperature, an operation circuit 15c produces a signal for fully opening the expansion valve.

The operation circuit 15c conducts a proportional integrating computation of an offset ΔV between the superheating degree setting signal $V_{SHO}$ set at the superheating degree setting circuit 15b and the superheating degree signal $V_{SH}$ based on the temperature difference between the outlet and inlet of the evaporator 5, and outputs this signal as the voltage signal Vx.

An output circuit 15d outputs an ON-OFF duty signal $V_0$ for determining the opening of the expansion valve in accordance with the output voltage signal Vx from the operation circuit 15c. The opening of the expansion valve is controlled in accordance with the ON-OFF duty signal $V_0$, such that the actual superheating degree $V_{SH}$ is controlled in conformity with the set superheating degree $V_{SHO}$.

In the described embodiment, the expansion valve 4 is constituted by an ON-OFF solenoid-actuated valve of the type shown in Japanese Patent Publication No. 56-16353/1981. This valve is composed of a solenoid type actuator 4a and a valve portion 4b actuated by the latter, and operates in a manner which is shown in Japanese Patent Publication No. 16353/1981.

An explanation will be made hereinunder as to the method of measuring the flow rate of the refrigerant.

In the field of refrigeration cycle, it is wellknown that the flow rate of refrigerant flowing in the expansion valve is given by the following formula (3):

$$Q = CA \sqrt{(P_i - P_o)\gamma i} \quad (Kg/s) \quad (3)$$

where,
C: flow rate coefficient of refrigerant (constant)
A: opening area of expansion valve ($m^2$)
Pi: inlet pressure of expansion valve ($Kg/m^2$)
Po: outlet pressure of expansion valve ($Kg/m^2$)

γi: refrigerant density at expansion valve inlet (Kg/m²)

According to the invention, means are provided for directly or indirectly detecting the values of the factors mentioned above and for converting the detected values into electric signals, and the control circuit of the refrigeration cycle is provided with a calculation means for calculating the flow rate Q from these electric signals. Thus, according to the invention, the refrigeration cycle itself is provided with a function for measuring the flow rate of refrigerant.

The embodiment of the apparatus for measuring the refrigerant flow rate has a circuit $18a$ for calculating the opening area of the expansion valve. This circuit $18a$ can be composed of a known function generating circuit.

In case of an ON-OFF type expansion valve, the opening area of the expansion valve is given by the following formula:

$$Ao \cdot T \tag{4}$$

where,
Ao: full open area (m³)
T: ratio of opening time to one open-close or ON-OFF period (%)

The full opening area Ao is a given fixed value, while ratio Td is determined as a function of the output voltage Vx from the operation circuit $15c$.

Consequently, the formula (4) can be modified as follows:

$$A_1 = Ao \cdot K_1 \cdot (ao \cdot K_1) \cdot Vx \tag{5}$$

where, $K_1$ represents a proportional constant.

Therefore, the function generating circuit constituting the opening area calculation circuit $18a$ is designed so as to produce a signal Va which is obtained by multiplying the output voltage Vx of the operation circuit $15c$ by $(Ao \cdot K_1)$.

The detecting means for detecting the pressure at the inlet of the expansion valve includes by a temperature sensor 12 such as a thermistor provided on the gas phase portion of the liquid tank 3, and a temperature-pressure converting circuit $18b$.

The refrigerant pressure at the high-pressure side can be known by measuring the temperature of the refrigerant between the condenser outlet and the expansion valve inlet and checking the temperature with a table showing the relationship between the temperature and pressure which is known beforehand.

The temperature in the gas phase of the liquid tank corresponds to the refrigerant pressure at the high-pressure side for the reason explained below.

An explanation will be given hereinunder as to the pressure and temperature of the refrigerant at the high-pressure side.

Figure 5:
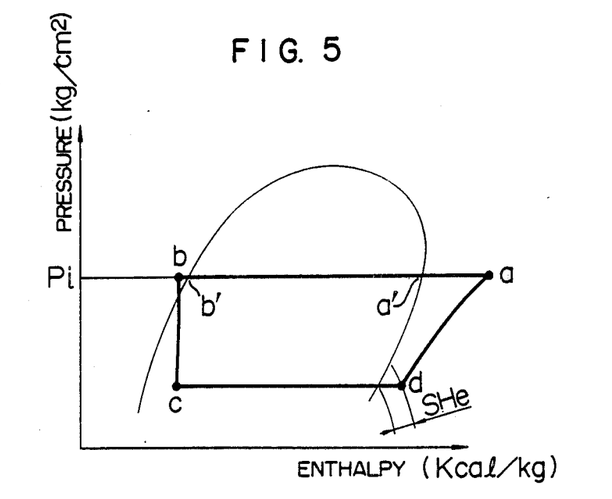
FIG. 5 is a mollier chart for explaining a refrigeration cycle.

At the inlet of the condenser (a in FIG. 1), the refrigerant takes a superheated gas phase as shown in FIG. 5. In this state, the relationship between the pressure and the temperature is not constant, but is changed independence upon the condition of the cycle operation.

The state of the refrigerant in the condenser is changed from the superheated gaseous phase to supercooled liquid phase. In the condenser, therefore, there exists a saturated condition of refrigerant in which the pressure and the temperature are in a predetermined saturating relationship (FIG. 3) as between the point (a') and (b') in FIG. 5. Thus, the high-pressure side pressure Pvi can be determined by measuring the temperature of the refrigerant between the points (a') and (b'). Actually, however, this measurement encounters the following difficulties.

The region of the space in the condenser in which the saturated refrigerant vapor exists is not fixed but is changed independence upon the condition of operation of the cycle. In other words, the region which is always occupied by the saturated refrigerant vapor is very small in the condenser.

Generally, the condenser has a plurality of parallel paths for the refrigerant. The change of the state of the refrigerant does not uniformly take place with all refrigerant paths. It is therefore difficult to select the position of the representative saturated vapor of refrigerant.

A temperature detector exposed to a refrigerant path increases the flow resistance so as to impair the performance of the refrigeration cycle.

Theoretically, the refrigerant between the condenser outlet ($b_1$) and the expansion valve inlet ($b_4$) is the supercooled liquid refrigerant having a state corresponding to the point (b) in FIG. 5. Actually, however, the change of state of refrigerant is not uniform with all refrigerant paths in the condenser, so that the gas refrigerant often exists in the liquid refrigerant coming out of the condenser. In addition, a part of the liquid refrigerant is evaporated by the heat in the engine room. Thus, the state of the refrigerant is not always constant over the entire region between the condenser outlet and the expansion valve inlet.

Figure 3:
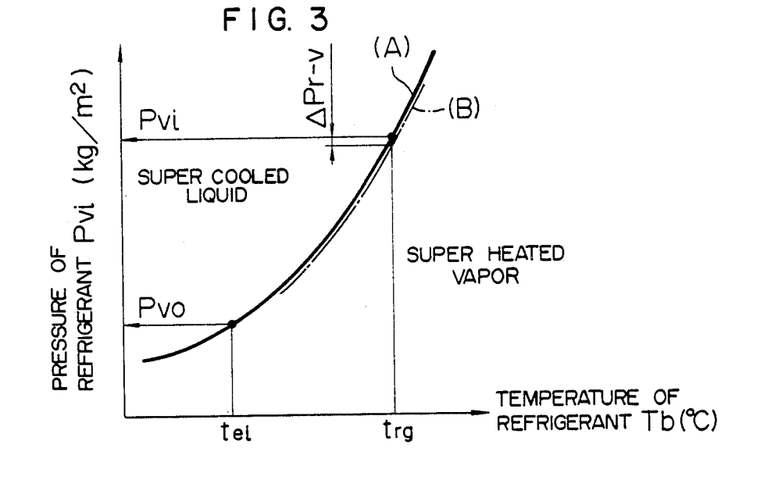
FIG. 3 is a diagram showing saturation characteristics of a refrigerant.
Figure 7:
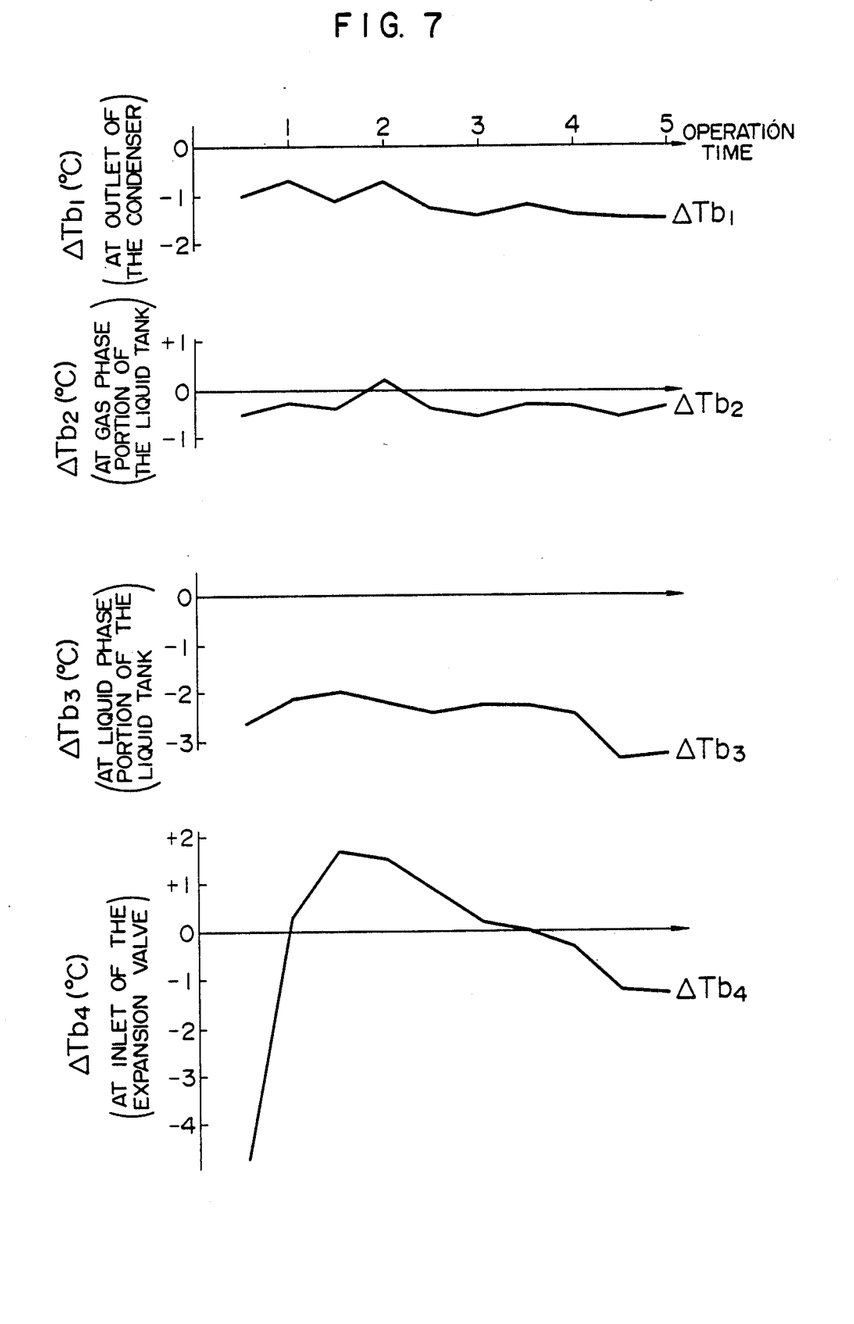
FIG. 7 is a diagram exemplarily showing the manner in which the temperature difference $\Delta T$ between the refrigerant temperature $Tb$ and the saturation temperature $T_{HS}$ changes along the path between the condenser outlet and the expansion valve inlet.

Experiments have been conducted in which the refrigerant temperature $T_b$ and the pressure Pvi where measured at four different points $b_1$ to $b_4$ between the condenser outlet and the expansion valve inlet, and the saturation temperature $T_{HS}$ was determined from the measured pressure Pvi upon consulation with the saturation characteristics as shown in FIG. 3. Then, the difference $\Delta T$ ($=T_b-T_{HS}$) between the measured refrigerant temperature and the saturation temperature determined in accordance with the saturation characteristics was measured to obtain a result as shown in FIG. 7.

From this result, it is understood that the saturation temperature $T_{HS}$ corresponding to the refrigerant pressure Pvi in the high-pressure side can be detected accurately through the measurement of the temperature $T_{b2}$ of the gas phase refrigerant in the liquid tank, namely, at point ($b_2$), and that the pressure Pvi can be known accurately by using the thus determined temperature $T_{b2}$ in view of the saturation characteristics shown in FIG. 3. The reason why the temperature $T_{b2}$ of the gas phase refrigerant in the liquid tank closely approximates the saturation temperature Ts is that the gas phase refrigerant and liquid phase refrigerant coexist in the liquid tank such that they have a heat exchange relationship with each other, so that the superheated gas refrigerant mixed in the liquid refrigerant discharged out from the condenser makes a heat exchange with the liquid refrigerant in the liquid tank so as to become saturated vapor refrigerant through a heat exchange with the liquid refrigerant in the liquid tank.

Figure 6:
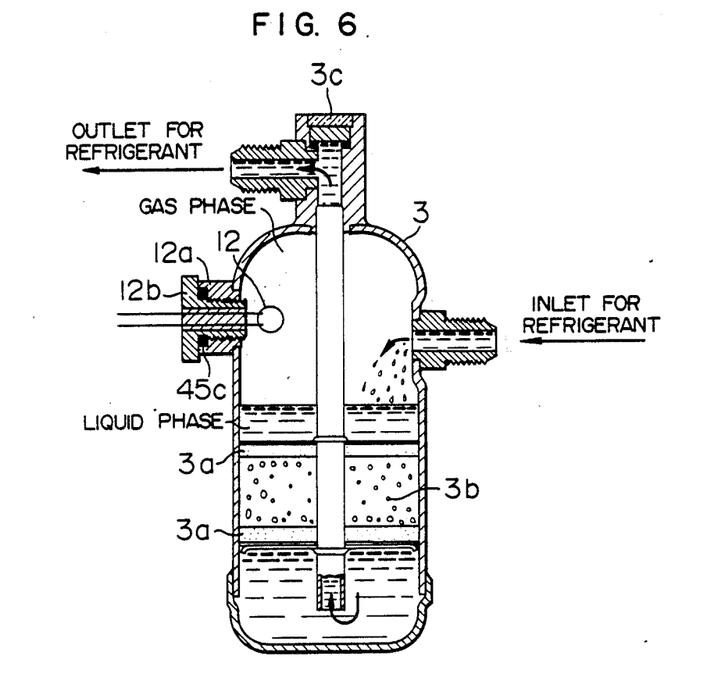
FIG. 6 is a cross-sectional view of a liquid tank.

Thus, according to the invention, a temperature detector 12 such as a thermistor is attached at the gas phase portion of the liquid tank 3 through a union $12a$ brazed to the liquid tank 3, in order to detect the pressure Pvi of the high-pressure side of the cycle. Namely, a connector $12b$ to which the thermistor 12 is secured, is threatably secured to the union 12a through a seal 12c. The detection signal $V_{Tb2}$ derived from the thermistor 12 is inputted to the control circuit 18. The liquid tank 3 has a strainer 3a and a drier 3b for trapping any foreign matter and water in the refrigerant, so that only the liquid refrigerant is delivered to the expansion valve 4b. A sight glass 3c is provided for allowing a visual inspection of the state of the liquid refrigerant. In operation, the control circuit 18 conducts a calculation so as to produce a pressure signal $V_{pvi}$ corresponding to the measured temperature signal $V_{Tb2}$, by the temperature-pressure converting circuit which operates in accordance with the saturation characteristics shown in FIG. 3. The relationship between the measured temperature signal $V_{Tb2}$ and the pressure $V_{pvi}$ may be stored in the form of a conversion map in a ROM of a microcomputer.

In general, the pressure drop $P_{r-v}$ between the liquid tank 3 and the expansion valve 4 is negligible.

When the refrigerant pipeline between the liquid tank 3 and the expansion valve 4 is long, however, it is necessary that the pressure drop is premeasured or precalculated and the characteristic of the function generating circuit is precorrected in accordance with this pressure drop.

The detection means for detecting the refrigerant pressure at the expansion valve outlet comprises a thermistor 10 for detecting the refrigerant temperature at the inlet of the evaporator 5 and a temperature-pressure converting circuit 18c. The temperature-pressure converting circuit 18c also includes a function generating circuit which is known per se.

As known to those skilled in the art, the refrigerant between the outlet of the expansion valve 4 and the inlet of the evaporator 5 takes the state of mixture phase in which both the liquid and gas phases coexist, i.e., in the saturated state. Therefore, as in the case of the detection of the pressure Pvi at the inlet of the expansion valve, by setting the characteristics of the function generating circuit so as to correspond to the saturated characteristics of the refrigerant, it is possible to output a voltage signal $V_{pvo}$ corresponding to the saturation pressure Pvo of the refrigerant at the inlet of the evaporator 5 from a temperature-pressure converting circuit 18c in response to the output voltage of the thermistor 10 corresponding to the saturation temperature of the refrigerant at the evaporator inlet.

The pressure loss $\Delta P_{v-E}$ between the expansion valve 4 and the evaporator 5 is smaller than the pressure loss $\Delta P_{r-v}$ between the liquid tank 3 and the expansion valve 4 and, therefore, can be neglected. This is because that the expansion valve 4 and the evaporator 5 are disposed in a unitary case so that both are maintained under the same atmosphere and the pipe therebetween is very short. Therefore, the saturation pressure at the inlet of the evaporator 5 can be regarded as being the saturation pressure at the outlet of the expansion valve 4.

The invention, however, does not exclude the correction of the characteristic of the function generating circuit constituting the temperature-pressure converting circuit 18 in accordance with the result of a precise measurement of the pressure loss between the expansion valve 4 and the evaporator 5.

The output signal from the thermistor 12 is delivered further to a temperature-density converting circuit 18d which also can be constituted by a known function generating circuit.

Figure 4:
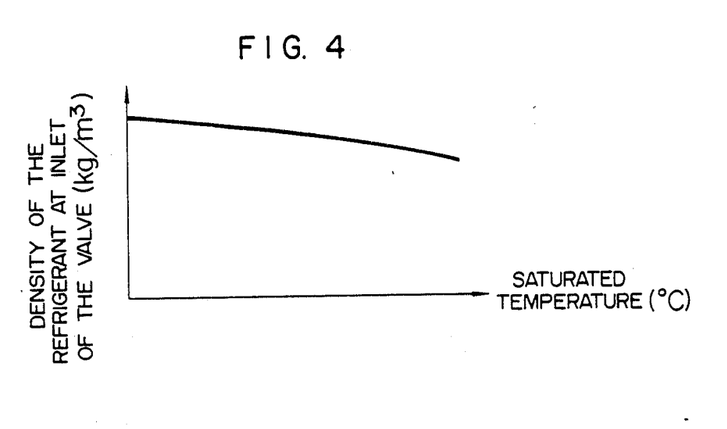
FIG. 4 is a diagram showing the relationship between the saturation temperature and density of the refrigerant at the valve inlet side.

Although the refrigerant at the inlet of the expansion valve is liquid, the density of the liquid refrigerant at the inlet of the expansion valve has a certain relationship to the saturation temperature of the refrigerant at the same position as shown in FIG. 4.

If the pressure loss of the refrigerant is neglegible, the saturation temperature of the refrigerant at the expansion valve inlet can be regarded as being equal to the refrigerant temperature in the gas phase portion of the liquid tank 3. Therefore, provided that the characteristic of the function generating circuit constituting the temperature-density converting circuit 18d is determined in accordance with the characteristic shown in FIG. 4, it is possible to obtain a voltage output signal Vr corresponding to the refrigerant density $\gamma i$ at the inlet of the expansion valve 4, by inputting to the function generating circuit a signal voltage corresponding to the refrigerant temperature in the gas phase portion of the liquid tank 3.

The refrigerant flow rate calculation circuit 18e comprises a known microcomputer and an A/D converter.

The output voltages Va, Vpvi, Vpvo and $V\gamma$ from the calculation circuit 18a for opening area of the expansion valve, temperature-pressure converting circuits 18b, 18c and the temperature-density converting circuit 18d are converted into digital values by the A/D converter in the calculation circuit for refrigerant flow rate 18e and the thus obtained digital signals are stored in a RAM of the microcomputer.

A calculating flow for executing the calculation of the formula (3) is stored in the ROM of the microcomputer so that the refrigerant flow rate calculating circuit 18e calculates the refrigerant flow rate by periodically reading the content of the RAM and conducting the calculation in accordance with the calculating flow stored in the ROM. The result of the calculation is outputted as the flow rate voltage signal $V_G$ after a D/A conversion.

In the described embodiment, the thus obtained refrigerant flow rate signal $V_G$ is used as one factor for the calculation of the pressure loss for attaining a higher precision of the pressure loss compensation signal which in turn is used in the setting of the superheating degree.

The value of the pressure loss of the refrigerant varies substantially in the form of a quadratic function of the flow rate of the refrigerant. By arranging such that the pressure loss value is corrected in accordance with the refrigerant flow rate signal $V_G$, it is possible to determine the value of the pressure loss with a precision which is much higher than that obtained in accordance with the formula disclosed in Japanese Patent Publication No. 16353/1981.

The refrigerant flow rate signal can be used also in the following calculation and judgement.

Detection of Leak of Refrigerant

Representing the rotation speed of the compressor by N, volumetric efficiency by $\eta_v$ and the specific volume of the compressor by v, the flow rate Gc of the refrigerant discharged from the compressor is given by the following formula:

$$Gc = Kc \cdot N \cdot \eta_n / V \qquad (6)$$

where, Kc is a constant.

It is known that the volumetric efficiency $\eta_v$ of the compressor is given as a function of the rotation speed N of the compressor and the pressures Pvi and Pvo of the refrigerant at the inlet and outlet sides of the expansion valve. It is also known that the specific volume v of the compressor is given as a function of the refrigerant pressure Pvo at the expansion valve outlet.

Therefore, the flow rate Gc of the refrigerant discharged from the compressor is given as a function of the rotational speed N of the compressor and the refrigerant pressures Pvi and Pvo at the inlet and outlet of the expansion valve.

According to the invention, the refrigerant flow rate Gc in the compressor is compared with the refrigerant flow rate Q in the expansion valve and, if a predetermined relationship between both flow rates, e.g., a condition expressed by Q>>Gc, is observed, it is judged that there is a leak of refrigerant.

Calculation of Refrigerating Power

In general, the refrigerating power of a refrigeration cycle is given by the following formula:

$$Y = Q(i_1 - i_2)$$

where, $i_1$: enthalpy at the evaporator inlet
$i_2$: enthalpy at the evaporator outlet Since the enthalpy $i_1$ at the evaporator inlet is given as a function of the temperature $T_2$ at the evaporator outlet, while the enthalpy $i_2$ at the evaporator outlet are is given a function of the pressure Pvi at the expansion valve inlet, the refrigerating power Y can be calculated from these values, the temperature $T_2$ and the pressure Pvi.

Using the thus calculated refrigerating power, it is possible to carry out various automatic controls such as the control of the opening of the air mix door, speed control of the blower, change-over of operation mode, and so forth.

Thus, in the described embodiment of the invention, the pressures at the inlet and outlet of the expansion valve are calculated from the refrigerant temperatures at the evaporator inlet and at the gas phase portion of the liquid tank which are closely related to the refrigerant pressures at the inlet and outlet of the expansion valve. It is, therefore, possible to measure the flow rate of the refrigerant by an inexpensive equipment, without using expensive pressure sensors.

In addition, since the refrigerant temperature at the expansion valve outlet is detected by the thermistor attached to the evaporator inlet for the purpose of measurement of the superheating degree, it is possible to reduce the number of thermistors taking part in the measurement.

Figure 2:
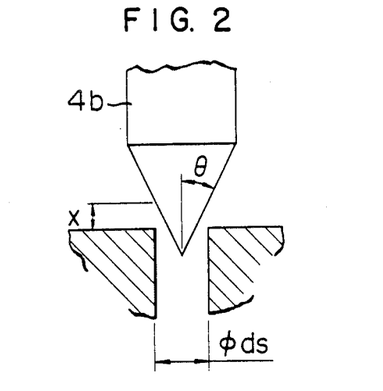
FIG. 2 is a schematic illustration of a portion of an expansion valve.

The electrically driven expansion valve used in the first embodiment may be substituted by a known mechanical expansion valve, without impairing the advantages of the invention. In this case, the opening degree of the expansion valve is calculated from the output signal Sx of an electromagnetic stroke sensor. The expansion valve also may be of the type actuated by a solenoid having a proportional operation characteristic. In such a case, the opening degree of the expansion valve can be calculated from the control signal Vx. Particularly, if a known poppet valve having a valve body shown in FIG. 2, the opening area A is determined in accordance with the following formula:

$$A = \pi x \cdot \sin\theta \, (d_s - x \cdot \sin\theta \cdot \cos\theta)$$

where, x represents the stroke of the valve (m), $d_s$ represents the orifice diameter (m) and $\theta$ represents the valve apex angle (deg.).

The stroke x of the valve is given as the output Sx of the stroke sensor or as the control signal Vx for controlling the expansion valve, so that the opening area A can be computed electrically provided that the other values of factors are fixed.

In the above described embodiment, the refrigerant density $\gamma_i$ at the expansion valve inlet is used as one of the factors required for the computation of the refrigerant flow rate Q. The refrigerant density $\gamma_i$, however, may be regarded as being constant and may be determined beforehand, on conditions that the refrigeration cycle sustains only a small fluctuation in the operating condition and that the gas phase refrigerant in the liquid tank exhibits only a small width of fluctuation. In such a case, the refrigerant flow rate is materially determined by the pressures at the inlet and outlet of the expansion valves and the opening degree of the expansion valve.

In the above described embodiment, in order to detect the pressures at the outlet and inlet of the expansion valve, the refrigerant temperatures at the evaporator inlet and the gas phase portion of the liquid tank are used. The refrigerant temperature at the evaporator inlet, however, may be substituted by a refrigerant temperature measured at any portion of the cycle between the evaporator inlet and the expansion valve outlet. Similarly, refrigerant temperature measured at any point between the condenser outlet and the expansion valve inlet can be used as the refrigerant temperature in the gas phase portion of the evaporator, although it is most preferred to detect the refrigerant temperature in the gas phase portion of liquid tank because this temperature approximates the saturation temperature most closely as stated before.

If an increase cost is acceptable, the refrigerant pressures at the inlet and outlet of the expansion valve may be detected directly by semiconductor pressure sensors disposed in the above-mentioned portions of the refrigeration cycle. In such a case, the output from the sensors may be directly inputted to the calculation circuit 18e without requiring any temperature-pressure converting means.

In the above described embodiment, the temperature-pressure converting circuit is provided on the input side of the calculation circuit constituted by the microcomputer. This arrangement, however, is not exclusive and may be substituted by an arrangement in which the outputs from the sensors are directly inputted to the microcomputer programmed in the temperature-pressure converting map provided in the ROM of the microcomputer.

In the above described embodiment, the refrigerant flow rate calculation circuit and the expansion valve opening area calculation circuit are constructed by independent circuits. This, however, is not exclusive and the arrangement may be such that the formula for computing the expansion valve opening degree is programmed in the microcomputer constituting the refrigerant flow rate calculation circuit, so that both the opening degree of the expansion valve and the refrigerant flow rate are calculated by a single microcomputer.

As described above, according to the invention, the flow rate of the refrigerant is calculated in accordance with a predetermined calculating formula from three electric signals: namely, an electric signal representing the detected opening degree of the expansion valve, and electric signal representing the measured refrigerant pressures at the inlet and outlet of the expansion valve. It is, therefore, possible to construct the refrigerant flow rate measuring apparatus such that this apparatus constitutes a part of the control system for controlling the refrigeration cycle. Thus, the invention affords a measurement of the refrigerant flow rate not only in test or experimental plants but also in the refrigeration systems which are produced and sold commercially. Consequently, the invention makes it possible to utilize the refrigerant flow rate as a factor for the calculation of the opening degree of the expansion valve, as well as a factor for various controls of the refrigeration cycle, thus affording quite a high precision of the refrigerant flow rate control, as well as a refrigeration cycle having various functions.

What is claimed is:

1. In a refrigeration cycle including a condenser and having an expansion valve for causing an adiabatic expansion of a refrigerant, a refrigerant flow rate measuring apparatus comprising:

a high-pressure side pressure detecting means for detecting a refrigerant pressure at an upstream side of said expansion valve; a low-pressure side pressure detecting means for detecting the refrigerant pressure at a downstream side of said expansion valve; an expansion valve opening degree detecting means for detecting a degree of opening of said expansion valves; and a calculating means for calculating a pressure differential between said high and low pressure side pressure detecting means and for calculating a flow rate of refrigerant passing through said expansion valve from a product of a square root of the pressure differential and an output of said expansion valve opening degree detecting means; and wherein said high pressure side pressure detecting means includes a temperature detecting means for detecting a temperature of the refrigerant in the high pressure side between a condenser outlet and an expansion valve inlet, at a temperature pressure converting means for converting an output of said temperature detecting means into a pressure in accordance with a predetermined saturation characteristic of said refrigerant.

2. A refrigerant flow rate measuring apparatus according to claim 1, wherein said low-pressure side pressure detecting means includes a temperature detecting means for detecting the refrigerant temperature in the portion of refrigeration cycle between expansion valve outlet and an evaporator inlet, and a temperature-pressure converting means for converting an output of said temperature detecting means into pressure in accordance with a predetermined saturation characteristic of said refrigerant.

3. A refrigerant flow rate measuring apparatus according to claim 1, wherein said expansion valve opening detecting means includes a stroke detecting means for detecting a stroke of said expansion valve and a stroke-valve valve opening degree converting means for determining an opening degree of said expansion valve in accordance with an output from said stroke detecting means.

4. In a refrigeration cycle including a liquid tank and having an expansion valve for causing an adiabatic expansion of a refrigerant, a refrigerant flow rate measuring apparatus comprising:

a high-pressure side pressure detecting means for detecting a refrigerant pressure at an upstream side of said expansion valve; a low-pressure side pressure detecting means for detecting the refrigerant pressure at a downstream side of said expansion valve; an expansion valve opening degree detecting means for detecting a degree of opening of said expansion valves; and a calculating means for calculating a pressure differential between said high and low pressure side pressure detecting means and for calculating a flow rate of refrigerant passing through said expansion valve from a product of a square root of the pressure differential and an output of said expansion valve opening degree detecting means; and wherein said high-pressure side pressure detecting means includes a temperature detecting means for detecting a refrigerant temperature in a gas phase portion of a liquid tank, and a temperature-pressure converting means for converting an output of said temperature detecting means into pressure in accordance with a predetermined saturation characteristic of said refrigerant.

5. A refrigerant flow rate measuring apparatus according to claim 4, wherein said low-pressure side pressure detecting means includes a temperature detecting means for detecting a refrigerant temperature in a portion of the refrigeration cycle between an expansion valve outlet and an evaporator inlet, and a temperature-pressure converting means for converting an output of said temperature detecting means into pressure in accordance with a predetermined saturation characteristic of said refrigerant.

6. A refrigerant flow rate measuring apparatus according to claim 4, wherein said expansion valve opening detecting means includes a stroke detecting means for detecting the stroke of said expansion valve and a stroke-valve opening degree converting means for determining an opening degree of said expansion valve in accordance with an output from said stroke detecting means.

7. In a refrigeration cycle including an evaporator and having an expansion valve for causing an adiabatic expansion of a refrigerant, a refrigerant flow rate measuring apparatus comprising:

a high-pressure side pressure detecting means for detecting a refrigerant pressure at an upstream side of said expansion valve; a low-pressure side pressure detecting means for detecting the refrigerant pressure at a downstream side of said expansion valve; an expansion valve opening degree detecting means for detecting a degree of opening of said expansion valves; and a calculating means for calculating a pressure differential between said high and low pressure side pressure detecting means and for calculating a flow rate of refrigerant passing through said expansion valve from a product of a square root of the pressure differential and an output of said expansion valve opening degree detecting means; and wherein said low-pressure side pressure detecting means includes a temperature detecting means for detecting a refrigerant temperature in a portion of the refrigeration cycle between an expansion valve outlet and an inlet of an evaporator, and a temperature-pressure converting means for an output of said temperature detecting means into pressure in accordance with a predetermined saturation characteristic of said refrigerant.

8. A refrigerant flow rate measuring apparatus according to claim 7, wherein said expansion valve opening detecting means includes a stroke detecting means for detecting the stroke of said expansion valve and a stroke-valve opening degree converting means for determining an opening degree of said expansion valve in accordance with an output from said stroke detecting means.

9. A refrigerant flow rate measuring apparatus according to one of claims 1, 4, or 7, wherein said apparatus further comprises a refrigerant density detecting means for detecting a density of said refrigerant at an expansion valve inlet and the calculated flow rate of the refrigerant is compensated in accordance with an increase and decrease of an output from said density detecting means.

10. A refrigerant flow rate measuring apparatus in a refrigeration cycle the refrigeration cycle including a compressor, a condenser, a liquid tank, an ON-OFF expansion valve, and an evaporator, all being connected in series, said refrigerant flow rate measuring apparatus comprising: calculating means for calculating ON-OFF duty of said expansion valve in accordance with a state of operation of said refrigeration cycle; electric actuating means for actuating said expansion valve in accordance with an output from said ON-OFF duty calculating means; high-pressure side pressure detecting means for detecting refrigerant pressure at an upstream side of said expansion valve; low-pressure side pressure detecting means for detecting refrigerant pressure at a downstream side of said expansion valve; and refrigerant flow rate calculating means for calculating a pressure differential between the high- and low-pressure sides detecting means and calculating a flow rate of said refrigerant passing through said expansion valve from a produce of a square root of said pressure differential and a substantial opening area of said expansion valve calculating from an output of said ON-OFF duty calculating means.

11. A refrigerant flow rate measuring apparatus according to claim 10, wherein said high-pressure side pressure detecting means includes means for detecting a temperature of the refrigerant between an outlet of said condenser and an inlet of said expansion valve, and temperature converting means for converting an output of said temperature detecting means into a said pressure in accordance with a predetermined saturation characteristic of the refrigerant.

12. A refrigerant flow rate measuring apparatus according to claim 10, wherein said high-pressure side pressure detecting means includes temperature detecting means for detecting temperature of the refrigerant in the gas phase portion of said liquid tank disposed between said condenser and said expansion valve and a temperature-pressure converting means for converting an output of said temperature detecting means into a pressure in accordance with a predetermined saturation characteristic of the refrigerant.

13. A refrigerant flow rate measuring apparatus according one of claims 11 or 12, wherein said apparatus further comprises a refrigerant density detecting means for detecting density of the refrigerant at an inlet side of said expansion valve from an output of said temperature detecting means for detecting temperature of the refrigerant at an upstream side of said expansion valve and a flow rate of the refrigerant calculated by said refrigerant flow rate calculating means is compensated in accordance with an output from said density detecting means.

14. A refrigerant flow rate measuring apparatus according to one of claims 10, 11, or 12, wherein said low-pressure side detecting means includes temperature detecting means includes temperature detecting means for detecting a temperature of the refrigerant between an outlet of said extension of said expansion valve and an inlet of said evaporant, and temperature-pressure converting means for converting an outlet of said temperature detecting means into a pressure in accordance with a predetermined saturation characteristic of the refrigerant.

* * * * *